(12) United States Patent
Yoon et al.

(10) Patent No.: US 12,400,790 B2
(45) Date of Patent: Aug. 26, 2025

(54) MULTILAYER ELECTRONIC COMPONENT

(71) Applicant: SAMSUNG ELECTRO-MECHANICS CO., LTD., Suwon-si (KR)

(72) Inventors: Dae Woo Yoon, Suwon-si (KR); Bum Suk Kang, Suwon-si (KR); Da Mi Kim, Suwon-si (KR); Su Jin Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 132 days.

(21) Appl. No.: 18/121,247

(22) Filed: Mar. 14, 2023

(65) Prior Publication Data

US 2024/0161976 A1 May 16, 2024

(30) Foreign Application Priority Data

Nov. 16, 2022 (KR) ........................ 10-2022-0153746

(51) Int. Cl.
*H01G 4/008* (2006.01)
*H01G 4/012* (2006.01)
*H01G 4/12* (2006.01)
*H01G 4/30* (2006.01)

(52) U.S. Cl.
CPC ............ *H01G 4/008* (2013.01); *H01G 4/012* (2013.01); *H01G 4/1227* (2013.01); *H01G 4/30* (2013.01)

(58) Field of Classification Search
CPC ...... H01G 4/008; H01G 4/012; H01G 4/1227; H01G 4/30; H01G 4/32
See application file for complete search history.

(56) References Cited

U.S. PATENT DOCUMENTS

| 10,446,321 | B2 | 10/2019 | Noda et al. |
| 2002/0023463 | A1* | 2/2002 | Siebers .................... C03C 3/085 |
| | | | 501/63 |
| 2002/0046861 | A1* | 4/2002 | Yokoyama ............. H01G 4/232 |
| | | | 174/565 |
| 2007/0109718 | A1* | 5/2007 | Horie ....................... H01G 4/30 |
| | | | 361/306.3 |

(Continued)

FOREIGN PATENT DOCUMENTS

| JP | 4211783 B2 | 1/2009 |
| JP | 5383962 B2 | 1/2014 |

(Continued)

OTHER PUBLICATIONS

H. J. T Ellingham, "Reducibility of oxides and sulphides in metallurgical processes", Journal of the Society of Chemical Industry, 1944, pp. 125-160.

*Primary Examiner* — Michael P McFadden
(74) *Attorney, Agent, or Firm* — MORGAN, LEWIS & BOCKIUS LLP

(57) ABSTRACT

A multilayer electronic component according to an embodiment of the present disclosure includes: a body including a dielectric layer and internal electrodes; and an electrode layer disposed on the body and connected to the internal electrodes; and the electrode layer includes Cu particles and glass, wherein oxides including Cu is disposed on at least a portion of the interface between the Cu particles and the glass.

23 Claims, 7 Drawing Sheets

(56) References Cited

U.S. PATENT DOCUMENTS

| | | | | |
|---|---|---|---|---|
| 2012/0154977 A1* | 6/2012 | Hur | ............... | H01G 4/2325 |
| | | | | 156/89.18 |
| 2012/0295122 A1* | 11/2012 | Park | ............... | C03C 3/089 |
| | | | | 428/471 |
| 2017/0018362 A1 | 1/2017 | Nishisaka et al. | | |
| 2017/0244023 A1* | 8/2017 | Kim | ............... | H10N 30/872 |
| 2018/0290917 A1 | 10/2018 | Nishimura et al. | | |

FOREIGN PATENT DOCUMENTS

| | | |
|---|---|---|
| JP | 6816225 B2 | 1/2021 |
| JP | 2021-153105 A | 9/2021 |
| KR | 10-2017-0009724 A | 1/2017 |
| KR | 10-2021-0052252 A | 5/2021 |
| WO | 2017/057246 A1 | 4/2017 |

\* cited by examiner

MULTILAYER ELECTRONIC COMPONENT

CROSS-REFERENCE TO RELATED APPLICATION(S)

This application claims benefit of priority to Korean Patent Application No. 10-2022-0153746, filed on Nov. 16, 2022, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser mounted on the printed circuit boards of various electronic products such as image display devices including a liquid crystal display device (LCD) and a plasma display device panel (PDP), computers, smartphones, and which serves to charge or discharge electricity.

Such multilayer ceramic capacitors may be used as components in a variety of electronic devices due to their small sizes, high capacitance, and ease of mounting. As various electronic devices such as computers and mobile devices have become miniaturized and capable of high-output, the demand for miniaturization and higher capacitance for multilayer ceramic capacitors is increasing.

In addition, with the recent increase of the interest of automotive industry in automotive electronic components, multilayer ceramic capacitors are also required to have high reliability characteristics to be used in automotive or infotainment systems.

When the sintered electrode that functions as the base electrode of the external electrode of the multilayer ceramic capacitor includes glass, glass elution may occur in acidic conditions such as plating solution.

Accordingly, an attempt has been made to prevent erosion due to the plating solution by including the corrosion-resistant glass in the external electrode, but the wettability with the metal particles of the external electrode may decrease, resulting in, as a side effect, a decrease of the density of the external electrode.

Therefore, in order to improve the density of the external electrode by improving the wettability between the glass and the metal particles, there is a need to improve the microstructure of the external electrode including the glass and the metal particles.

SUMMARY

One of the several objects of the present disclosure is to improve the Cu particles of the sintered electrode and the wettability of the glass when the sintered electrode includes glass.

One of the several objects of the present disclosure is to improve the density of the external electrode while preventing the phenomenon of glass elution occurring under acidic conditions such as plating solution when the sintered electrode includes glass.

However, the objects of the present disclosure are not limited to the above-described contents, and it will become clearer to understand during the process of describing specific embodiments of the present disclosure.

According to an aspect of the present disclosure, the multilayer electronic component includes a body including a dielectric layer and internal electrodes; an electrode layer disposed on the body and connected to the internal electrodes; wherein the electrode layer includes Cu particles, at least one oxide including Cu, and glass, and the at least one oxide including Cu may be disposed on at least a portion of an interface between the glass and the Cu particles.

According to another aspect of the present disclosure, a method to manufacture a multilayer electronic component including a body, the method including applying Cu particles and glass onto the body, and oxidizing at least a part of the Cu particles to form at least one oxide including Cu at an interface between Cu particles and the glass by sintering at a temperature of 650° C. or more and 800° C. or less the body to which the Cu particles and the glass were applied.

One of the many effects of the present disclosure is to improve the moisture resistance reliability of the multilayer electronic component by improving the wettability of the Cu particles and the glass by disposing oxides including Cu on at least a portion of the interface between the Cu particles included in the sintered electrode and the glass included in the sintered electrode.

One of the various effects of the present disclosure is to secure the wettability of Cu particles and corrosion-resistant glass in the sintered electrode even when including corrosion-resistant glass in the sintered electrode to secure corrosion resistance and minimize the chances of glass elution due to the plating solution.

However, various and beneficial advantages and effects of the present disclosure are not limited to the above-described contents, and it will be clearer to understand during the process of describing specific embodiments of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
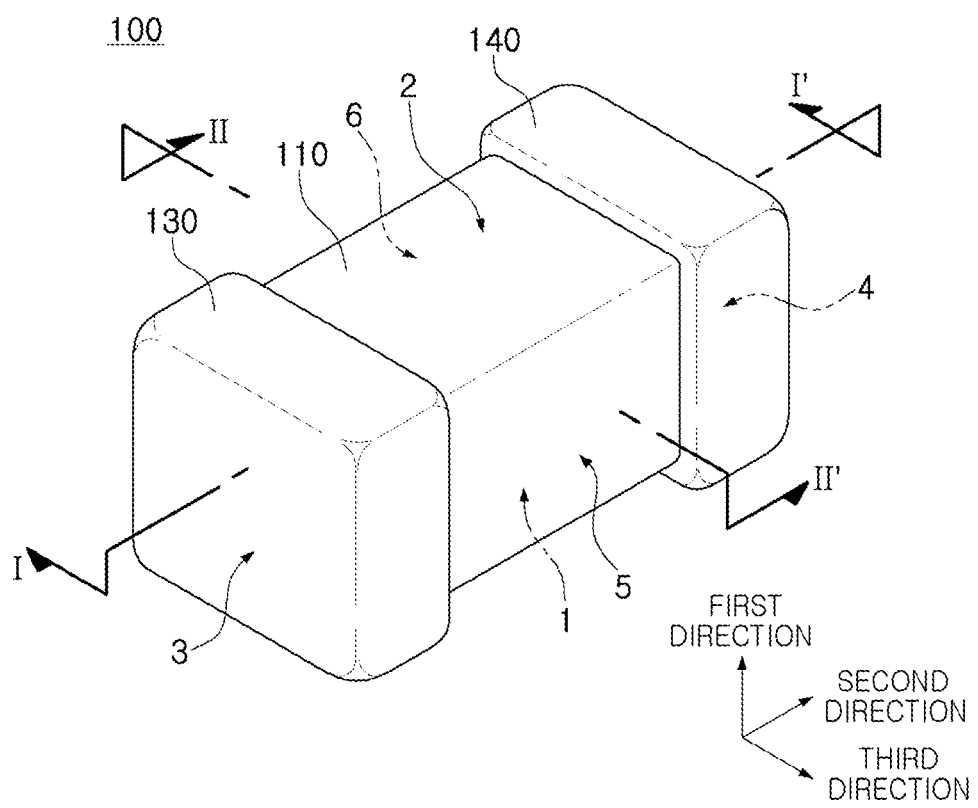
FIG. 1 is a perspective view of a multilayer electronic component according to an embodiment of the present disclosure.

Hereinafter, with reference to specific embodiments and accompanied drawings, the embodiments of the present disclosure will be described. However, the embodiments of the present disclosure may be modified into various other forms, and the scope of the present disclosure is not limited to the embodiments described below. In addition, the embodiments of the present disclosure are provided to more fully describe the present disclosure to those skilled in the art. Therefore, the shape and size of the elements in the drawings may be exaggerated for a clearer explanation, and the elements represented by the same reference marks on the drawings are the same elements.

In order to clearly describe the present disclosure in the drawings, parts that are not related to the description are omitted, and the size and thickness of each formation shown in the drawings are arbitrarily shown for the convenience of the description, so that the present disclosure is not necessarily limited to the shown configuration. In addition, components with the same function within the scope of the same idea are described using the same reference marks. Further, when a part "includes" an element in the entire description, it means that it may further include the other element rather than excluding other elements unless specifically stated to the contrary.

In the figure, the first direction may be defined as a stacking direction or a thickness T direction, the second direction as a length L direction, and the third direction as a width W direction.

FIG. 1 is a perspective view of a multilayer electronic component according to an embodiment of the present disclosure.

Figure 2:
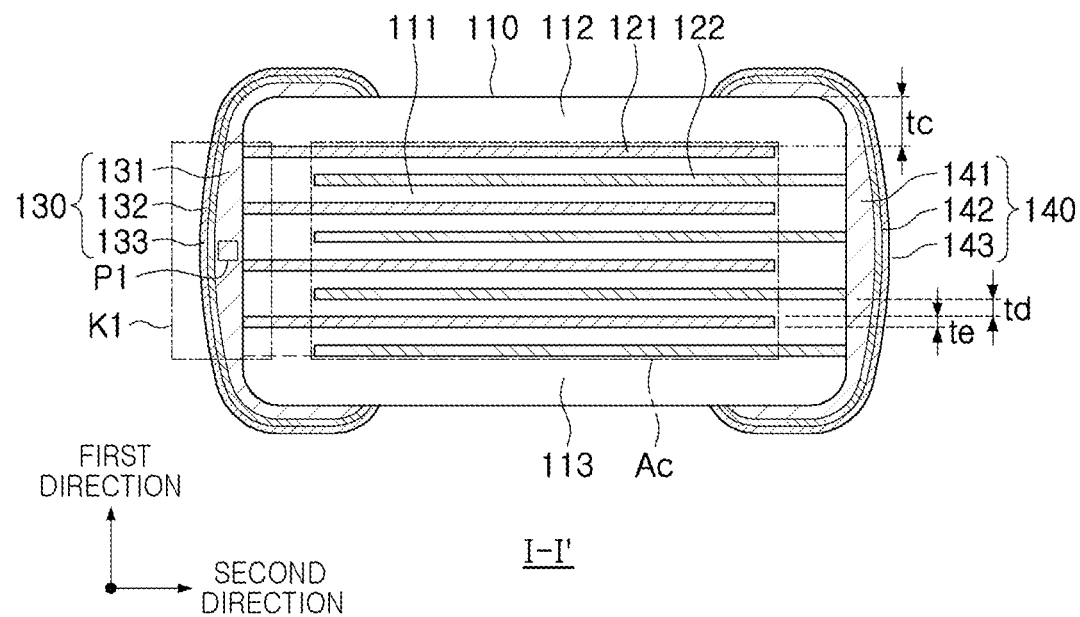
FIG. 2 is a cross section view taken along line I-I' of FIG. 1.

FIG. 2 is a cross sectional view taken along line I-I' of FIG. 1.

Figure 3:
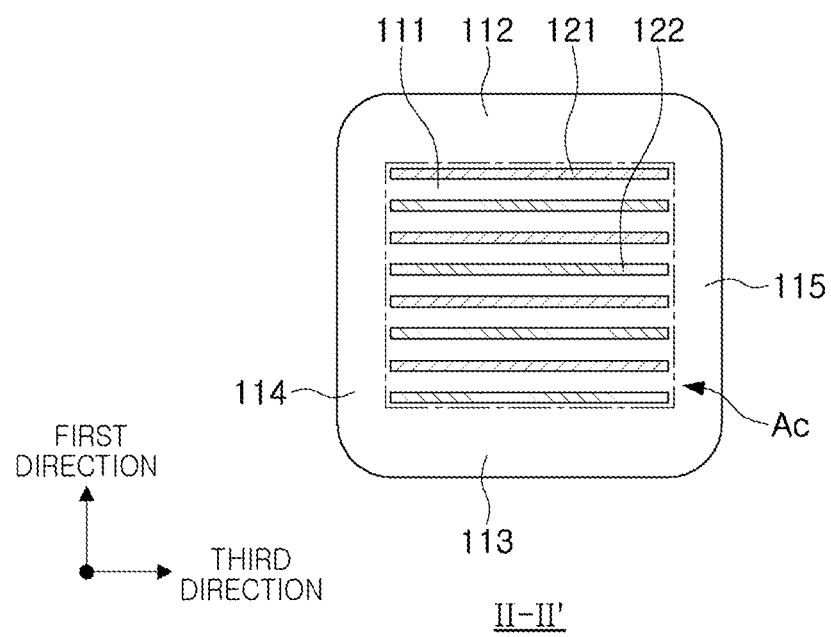
FIG. 3 is a cross section view taken along line II-II' of FIG. 1.

FIG. 3 is a cross sectional view taken along line II-II' of FIG. 1.

Figure 4:
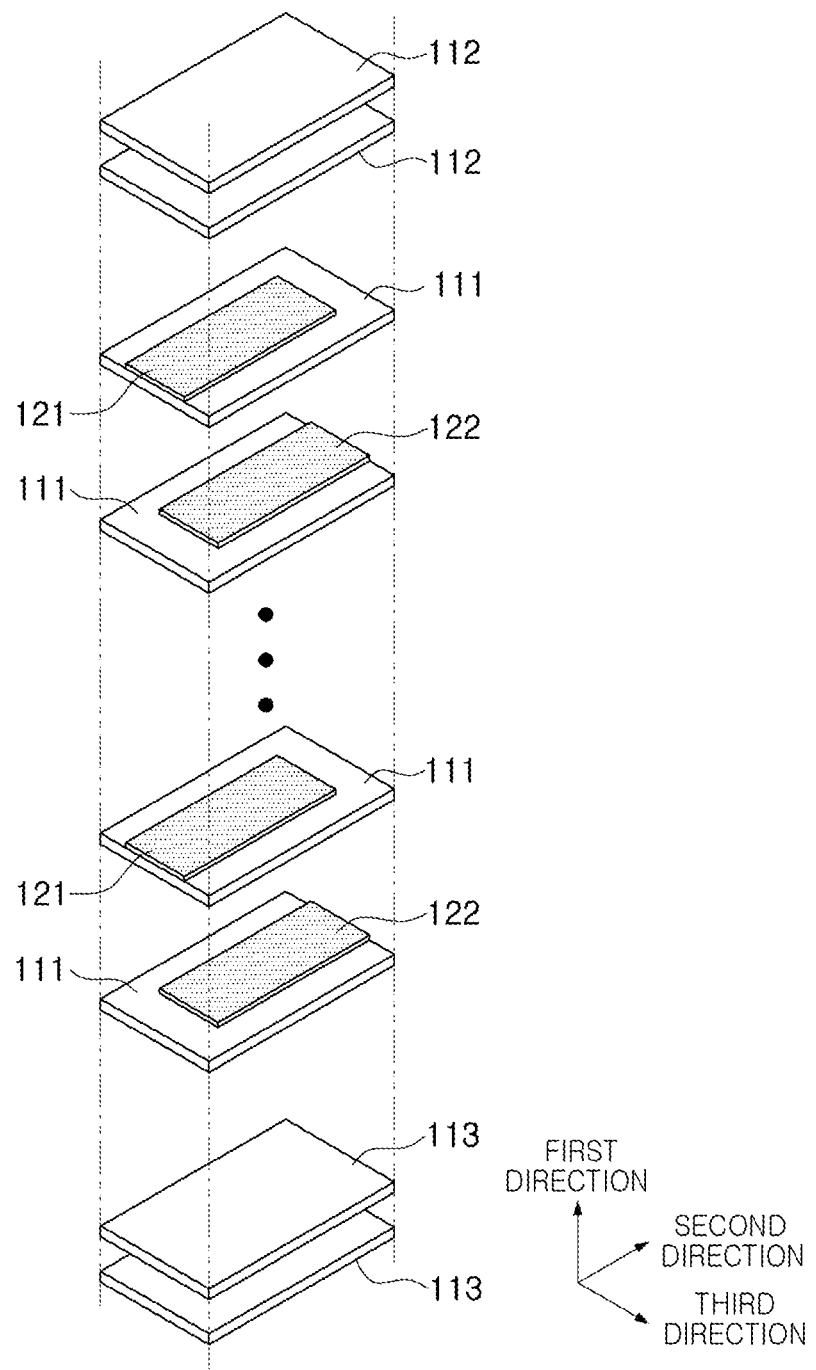
FIG. 4 is an exploded perspective view illustrating a disassembled body of FIG. 1.

FIG. 4 is an exploded perspective view illustrating a disassembled body of FIG. 1.

Figure 5:
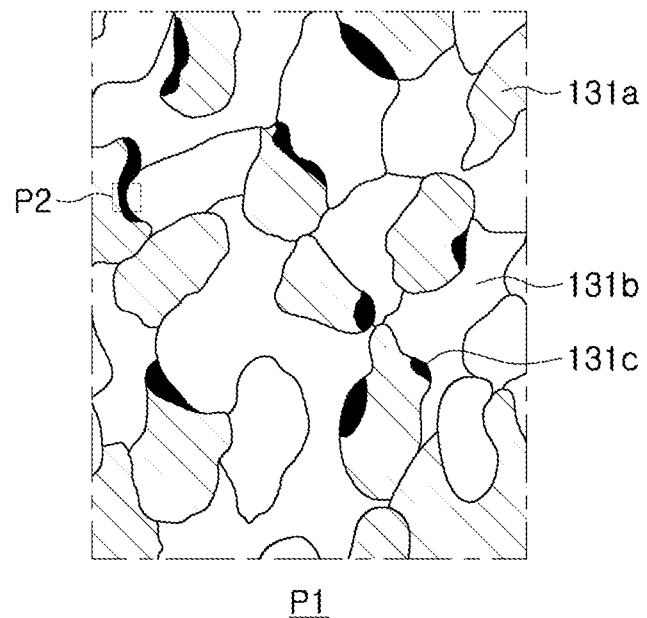
FIG. 5 is a mimetic view showing an enlarged P1 region of FIG. 2.

FIG. 5 is a mimetic view showing an enlarged P1 region of FIG. 2.

Figure 6:
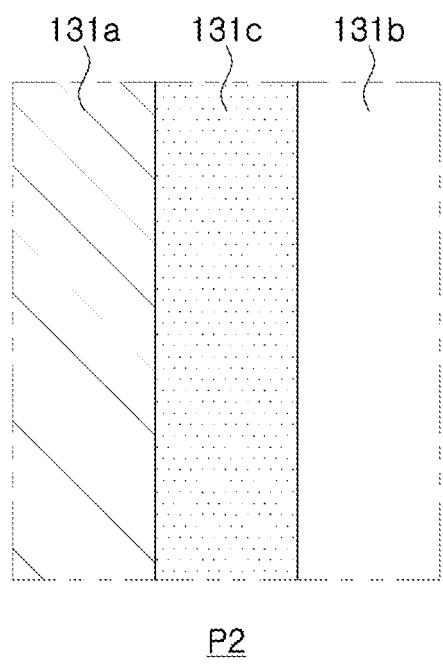
FIG. 6 is a mimetic view showing an enlarged P2 region of FIG. 5.

FIG. 6 is a mimetic view showing an enlarged P2 region of FIG. 5.

Figure 7:
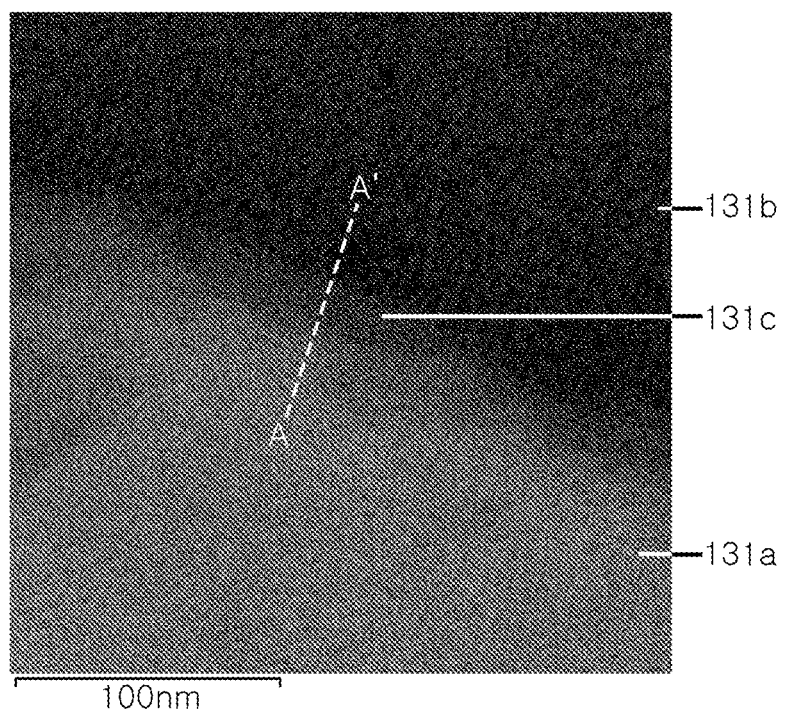
FIG. 7 is an image of the P2 region of FIG. 6 observed with a transmission electron microscope (TEM).

FIG. 7 is an image of region P1 of FIG. 2 observed with a transmission electron microscope (TEM).

Figure 8:
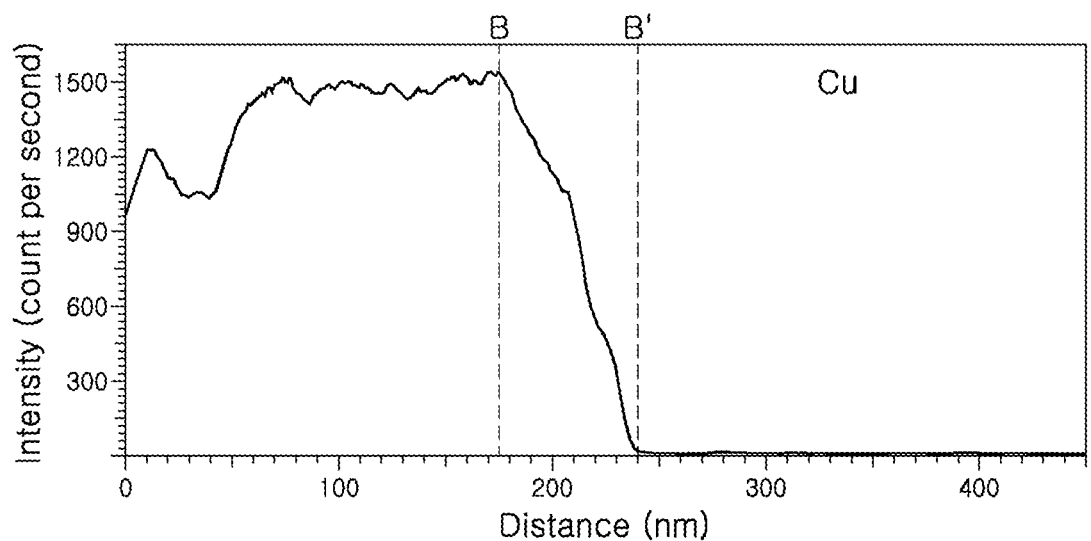
FIG. 8 is a line concentration profile analyzing the distribution of Cu element through Transmission Electron Microscope-Energy Dispersive X-ray Spectroscopy (TEM-EDX) along line A-A' of FIG. 7.

FIG. 8 is a line concentration profile analyzing the distribution of Cu element through Transmission Electron Microscope-Energy Dispersive X-ray Spectroscopy (TEM-EDX) along line A-A' of FIG. 7.

Figure 9:
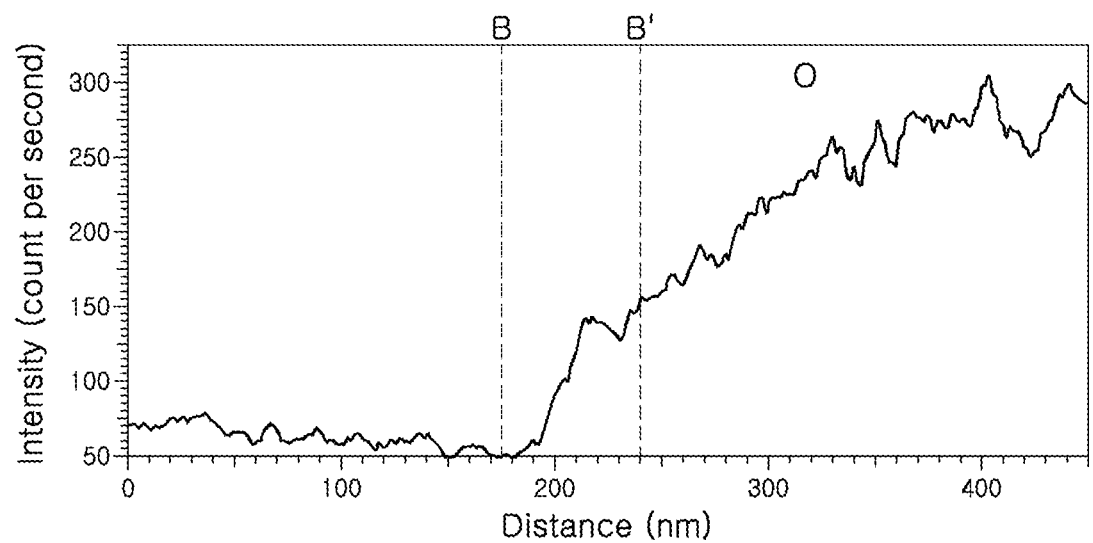
FIG. 9 is a line concentration profile analyzing the distribution of O element through Transmission Electron Microscope-Energy Dispersive X-ray Spectroscopy (TEM-EDX) along line A-A' of FIG. 7.

FIG. 9 is a line concentration profile analyzing the distribution of O element through Transmission Electron Microscope-Energy Dispersive X-ray Spectroscopy (TEM-EDX) along line A-A' of FIG. 7.

Figure 10:
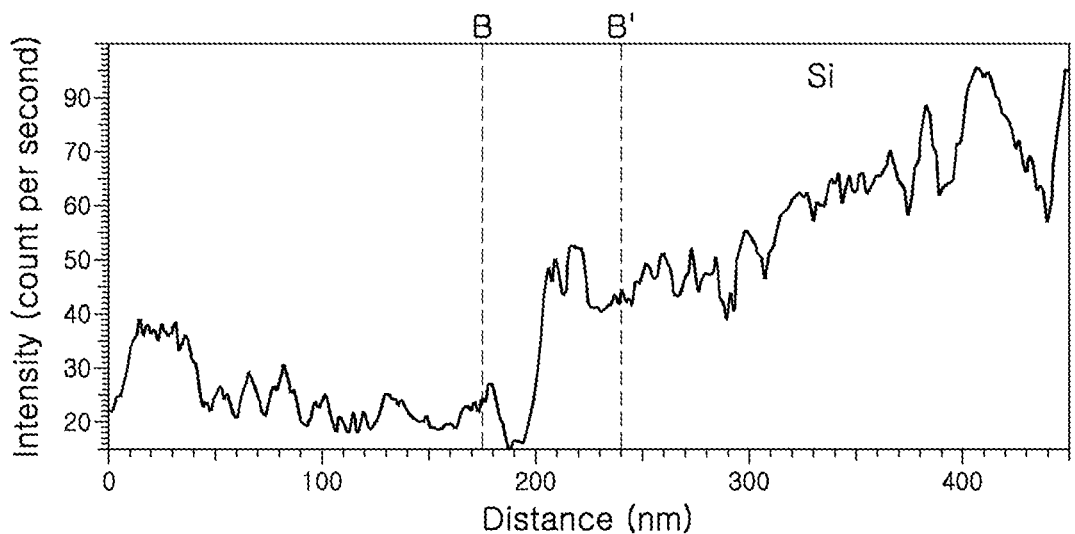
FIG. 10 is a line concentration profile analyzing the distribution of Si element through Transmission Electron Microscope-Energy Dispersive X-ray Spectroscopy (TEM-EDX) along line A-A' of FIG. 7.

FIG. 10 is a line concentration profile analyzing the distribution of Si element through Transmission Electron Microscope-Energy Dispersive X-ray Spectroscopy (TEM-EDX) along line A-A' of FIG. 7.

Figure 11:
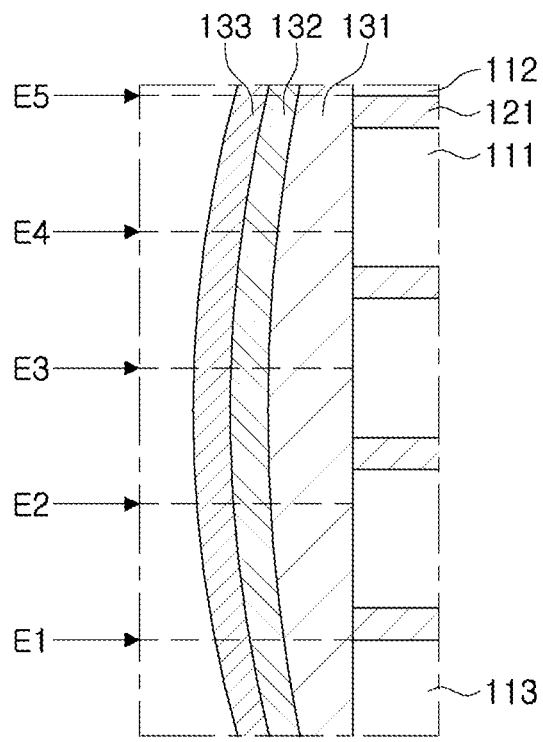
FIG. 11 is a mimetic view showing an enlarged K1 region of FIG. 2.

FIG. 11 is a mimetic view showing an enlarged K1 region of FIG. 2.

Hereinafter, with reference to FIGS. 1 to 11, the multilayer electronic component 100 and various embodiments according to an embodiment of the present disclosure will be described in detail.

Referring to FIGS. 1 to 6, the multilayer electronic component 100 according to an embodiment of the present disclosure includes a body 110 including a dielectric layer 111 and internal electrodes 121 and 122, and electrode layers 131 and 141 connected to internal electrodes 121 and 122 and disposed on the body 110, in which the electrode layers 131 and 141 include Cu particles 131a and glass 131b, and at least on a part of the interface between the Cu particles 131a and the glass 131b oxide including Cu 131c is disposed.

The body 110 includes alternately stacked dielectric layer 111 and internal electrodes 121 and 122.

Although there is no particular limitation on the specific shape of the body 110, as shown, the body 110 may be formed to have a cube shape or a similar shape. Due to the contraction of the ceramic powder included in the body 110 during the sintering process, the body 110 may not have a hexahedral shape with complete straight lines, but a substantial hexahedral shape.

The body 110 includes first and second surfaces 1 and 2 facing each other in a first direction (thickness direction), third and fourth surfaces 3 and 4 connected to the first and second surfaces 1 and 2 and facing each other in a second direction (length direction), and the fifth and sixth surfaces 5 and 6 connected to the third and fourth surfaces 3 and 4 and facing each other in a third direction (width direction).

The plurality of dielectric layers 111 forming the body 110 are in a calcined state, and the border between the adjacent dielectric layers 111 may be integrated so that it is difficult to check unless using a scanning electron microscope (SEM).

The raw materials forming the dielectric layer 111 are not particularly limited as long as sufficient capacitance can be obtained. For example, barium titanate material, lead composite perovskite material or strontium titanium oxide-based material may be used. The barium titanate materials may include $BaTiO_3$ based ceramic powder particles. $BaTiO_3$, and $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_x$ ($0<x<1$, $0<y<1$) or $Ba(Ti_{1-y}Zr_y)O_3$ ($0<y<1$), which are $BaTiO_3$ in which the Ba and Ti are partially substituted with Ca(calcium) and Zr(zirconium), etc., may be used as examples of ceramic powder particles.

In addition, the raw materials for forming the dielectric layer 111 may be powder particles such as barium titanate ($BaTiO_3$) to which various ceramic additives, organic solvents, binders, dispersants, and etc., are added according to the object of the present disclosure.

On the other hand, the average thickness td of the dielectric layer 111 does not need to be particularly limited. However, in general, when the dielectric layer is thinly formed with an average thickness less than 0.6 μm, or in particular when the average thickness td of the dielectric layer is 0.35 μm or less, there is a risk that the reliability may be reduced.

According to an embodiment of the present disclosure, at least a portion of the interface between the Cu particles 131a and the glass 131b included in the electrode layers 131 and 141 may include oxides including Cu, as it may improve the reliability, so that even when the average thickness td of the dielectric layer is less than 0.35 μm, excellent reliability can be secured.

Therefore, when the average thickness td of the dielectric layer is 0.35 μm or less, the effect according to the present disclosure can be more prominent, and miniaturization and higher capacitance of multilayer electronic component can be more easily achieved.

The average thickness td of the dielectric layer 111 may mean the average thickness of the dielectric layer 111 disposed between the first and second internal electrodes 121 and 122.

The average thickness of the dielectric layer 111 can be measured by scanning the images of the cross section of the length and thickness direction (L-T) of the body 110 with a scanning electron microscope (SEM) at 10,000× magnification. More specifically, the average value can be measured by measuring the thickness at 30 equidistant interval points in the length direction in order to measure one dielectric layer from a scanned image. The 30 equidistant interval points may be designated in the capacitance forming portion Ac. In addition, if the average value measurement is extended to 10 dielectric layers to measure the average value, the average thickness of the dielectric layers may be further generalized. Other methods and/or tools appreciated by one of ordinary skill in the art, even if not described in the present disclosure, may also be used.

The body 110 may include a capacitance forming portion Ac that forms capacitance and includes a first internal electrode 121 and a second internal electrode 122 that are alternately disposed opposing each other with the dielectric layer in between. The body may also include cover portions 112 and 113 formed in the upper part and the lower part of the capacitance forming portion Ac.

In addition, the capacitance forming portion Ac is a part contributing to the capacitance formation of the capacitor, and may be formed by repeatedly stacking the dielectric layer 111 between each of the first and second internal electrodes 121 and 122.

The upper cover portion 112 and the lower cover portion 113 may be formed by stacking a single dielectric layer or two or more dielectric layers on the upper or lower surface of the capacitance forming portion Ac in the thickness direction, respectively, and basically serve to prevent damage to the internal electrodes by physical or chemical stress.

The upper cover portion 112 and the lower cover portion 113 do not include an internal electrode and may include the same material as the dielectric layer 111.

That is, the upper cover portion 112 and the lower cover portion 113 may include ceramic materials, for example, barium titanate ($BaTiO_3$) based ceramic materials.

The average thickness tc of the cover portions 112 and 113 does not need to be particularly limited. However, in order to more easily achieve miniaturization and higher capacitance of multilayer electronic component, the average thickness tc of the cover portions 112 and 113 may be 15 μm or less. In addition, according to an embodiment of the present disclosure, at least a portion of the interface between the Cu particles 131a and the glass 131b included in the electrode layers 131 and 141 may include oxides including Cu, as it may improve the reliability, so that even when the average thickness td of the cover portions 112 and 113 is less than 0.35 μm, excellent reliability can be secured.

The average thickness tc of the cover portions 112 and 113 may mean the size of the cover portions 112 and 113 along the first direction, and may be an average value of the size of the cover portions 112 and 113 along the first direction measured at five equidistant interval points from the upper or lower part of the capacitance forming portion Ac. The average size of the of the cover portions 112 and 113 can be measured by scanning the images of the cross section of the length and thickness direction (L-T) of the body 110 with a scanning electron microscope (SEM) at 10,000× magnification. Other methods and/or tools appreciated by one of ordinary skill in the art, even if not described in the present disclosure, may also be used.

On the sides of the capacitance forming portion Ac, margin portions 114 and 115 may be disposed.

The margin portions 114 and 115 include a margin portion 114 disposed on the fifth surface 5 of the body 110 and a margin portion 115 disposed on the sixth surface 6. That is, the margin portions 114 and 115 may be disposed on both sides in the width direction of the ceramic body 110.

As shown in FIG. 3, the margin portions 114 and 115 may mean an area between the end-surfaces of the first and second internal electrodes 121 and 122 and the border surface of the body 110, based on a cross section cut in the width-thickness (W-T) directions of the body 110.

The margin portions 114 and 115 may basically play a role in preventing damage to the internal electrodes by physical or chemical stress.

The margin portions 114 and 115 may be formed by applying a conductive paste on the ceramic green sheet except the place where the margin portions 114 and 115 are formed.

In addition, in order to suppress an offset by the internal electrodes 121 and 122, the internal electrodes may be cut, after stacking, to be exposed to the fifth and sixth surfaces 5 and 6 of the body, and then a single dielectric layer or two or more dielectric layers are stacked in the width direction on both sides of the capacitance forming portion Ac to form margin portions 114 and 115.

The internal electrodes 121 and 122 are alternately stacked with the dielectric layer 111.

The internal electrodes 121 and 122 may include first and second internal electrodes 121 and 122. The first and second internal electrodes 121 and 122 are alternately disposed to oppose each other with the dielectric layer 111 constituting the body 110 in between, and may be exposed to the third and fourth surfaces 3 and 4 of the body 110, respectively.

Referring to FIG. 2, the first internal electrode 121 is spaced apart from the fourth surface 4 and exposed through the third surface 3, and the second internal electrode 122 is spaced apart from the third surface 3 and may be exposed through the fourth surface 4.

At this time, the first and second internal electrodes 121 and 122 may be electrically separated from each other by the dielectric layer 111 disposed there in between.

Referring to FIG. 3, the body 110 may be formed by alternately stacking a ceramic green sheet printed with the first internal electrode 121 and a ceramic green sheet printed with the second internal electrode 122, and then formed by sintering.

The materials forming the internal electrodes 121 and 122 are not particularly limited, and materials having excellent electrical conductivity can be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti) and alloys thereof.

In addition, the internal electrodes 121 and 122 may be formed with a conductive paste for internal electrodes including one or more of nickel (Ni), copper (Cu), palladium (Pd), silver (Ag), gold (Au), platinum (Pt), tin (Sn), tungsten (W), titanium (Ti) and alloys thereof, printed on a ceramic green sheet for internal electrodes. For the printing method of the conductive paste for the internal electrode, a screen printing method or a gravure printing method may be used, and the present disclosure is not limited thereto.

On the other hand, the average thickness to of the internal electrodes 121 and 122 does not need to be particularly limited. However, in general, when the internal electrodes are thinly formed with a thickness of less than 0.6 μm, or in particular when the average thickness td of the internal electrodes is 0.35 μm or less, there is a risk that the reliability may be reduced.

According to an embodiment of the present disclosure, at least a portion of the interface between the Cu particles 131a and the glass 131b included in the electrode layers 131 and 141 may include oxides including Cu, as it may improve the reliability, so that even when the average thickness of the internal electrodes 121 and 122 is less than 0.35 μm, excellent reliability can be secured.

Therefore, when the average thickness of the internal electrodes 121 and 122 is 0.35 μm or less, the effect according to the present disclosure may be more prominent, and miniaturization and higher capacitance of the multilayer electronic component can be more easily achieved.

The average thickness to of the internal electrodes 121 and 122 may mean the average thickness of the internal electrodes 121 and 122.

The average thickness of the internal electrodes 121 and 122 can be measured by scanning the images of the cross section of the length and thickness direction (L-T) of the body 110 with a scanning electron microscope (SEM) at 10,000 magnifications. More specifically, the average value can be measured by measuring the thickness of one internal electrode at 30 equidistant interval points in the length direction from a scanned image. The 30 equidistant interval points may be designated in the capacitance forming portion Ac. In addition, if the average value measurement is extended to 10 internal electrodes to measure the average value, the average thickness of the internal electrodes may be further generalized. Other methods and/or tools appreciated by one of ordinary skill in the art, even if not described in the present disclosure, may also be used.

On the body 110, electrode layers 131 and 141 connected to the internal electrodes 121 and 122 may be disposed. Specifically, the electrode layers 131 and 141 may be disposed on the third surface 3 and the fourth surface 4 of the body 110, and may include a first electrode layer 131 disposed on the third surface 3 of the body 110 to be connected to the first internal electrode 121, and a second electrode layer 141 disposed on the fourth surface 4 of the body 110 to be connected to the second internal electrode 121.

In this embodiment, the multilayer electronic component 100 describes a structure including two electrode layers 131 and 141, but the number or shape of the electrode layers 131 and 141 may be changed according to the form of the internal electrodes 121 and 122 or other purposes.

In addition, the embodiments described here based on the first electrode layer 131 may likewise be applied to the second electrode layer 141.

The electrode layers 131 and 141 may include Cu particles. Through this, electrical connectivity with the internal electrodes 121 and 122 can be secured, and in particular, when the internal electrodes 121 and 122 include Ni, the electrical connectivity and adhesion strength between the internal electrodes 121 and 122 and the electrode layers 131 and 141 can be improved by forming a Ni—Cu alloy.

The electrode layers 131 and 141 may include glass in addition to conductive metal particles such as Cu particles. The electrode layers 131 and 141 may be formed by applying a conductive paste including a plurality of Cu powder particles and glass to the third and fourth surfaces 3 and 4 of the body 110, putting it through a drying process and then sintering it at a temperature of 860° C. or less. In the sintering process, the plurality of Cu powder particles included in the conductive paste can be necked to ensure electrical connectivity between the conductive particles. The glass included in the conductive paste can play a role in increasing the density of the electrode layers 131 and 141 by filling the voids that may occur between the electrode layers 131 and 141 in the sintering process, and may serve to improve adhesion strength with the body 110 that uses the ceramic material as the main component.

In the sintering process of the electrode layers 131 and 141, the glass may exhibit liquid-like behavior by plastic deformation. At this time, the glass may show wettability with respect to Cu particles. The greater the wettability between the Cu particles and the glass, the larger the contact area of the Cu particles and the glass in the electrode layers 131 and 141 finally formed, thereby improving not only the adhesion strength between them, but also the density of the electrode layers 131 and 141 and the reliability against the external moisture and plating solution of the multilayer electronic component 100 can also be improved, as well.

In the present disclosure, a reaction layer is formed on at least a portion of the interface between the Cu particles 131a and the glass 131b included in the electrode layers 131 and 141 in order to improve the wettability between the Cu particles and the glass, and finally, it is intended to increase the density of the electrode layers 131 and 141 so that the reliability of the multilayer electronic component 100 is improved.

According to an embodiment of the present disclosure, the electrode layers 131 and 141 include Cu particles 131a and the glass 131b, and on at least a portion of the interface between the Cu particles 131a and the glass 131b oxides including Cu 131c is disposed.

FIG. 5 is a mimetic view enlarging region P1 of FIG. 2.

Referring to FIG. 5, the electrode layer 131 includes Cu particles 131a and the glass 131b, and the Cu particles 131a and the glass 131b may form an electrode layer 131 being in a calcined state. In this case, the Cu particles 131a and the glass 131b may contact each other at the interface, and oxides including Cu 131c may be disposed on a part of the interface.

FIG. 6 is a mimetic view enlarging the P2 region of FIG. 5.

Referring to FIG. 6, the P2 region is an enlargement of one of the regions in which oxides including Cu 131c particles are formed on the interface between the Cu particles 131a and the glass 131b among the electrode layers 131 and 141. That is, in the P2 region, the Cu particles 131a and the glass 131b are not directly in contact, but are in contact through the oxides including Cu 131c. As described above, since the glass 131b exhibits better wettability with respect to the oxides including Cu 131c than the Cu particles 131a, the oxides including Cu 131c is partially disposed on the interface between the Cu particles 131a and the glass 131b to improve the density of the electrode layer 131 to improve the reliability of the multilayer electronic component 100.

FIG. 7 is an image of the P2 region of FIG. 6 observed with a transmission electron microscope (TEM). Referring to FIG. 7, it can be seen that in the P2 region, at least a portion of the interface between the Cu particles 131a and the glass 131b includes oxides including Cu 131c. Hereinafter, in FIGS. 8 to 10, the content and distribution of elements included along line A-A' will be described.

FIG. 8 is a line concentration profile analyzing the distribution of Cu element through Transmission Electron Microscope-Energy Dispersive X-ray Spectroscopy (TEM-EDX) along line A-A' according to FIG. 7.

Referring to FIG. 8, it can be seen that the Cu element gradually decreases along line A-A' to converge to zero. The part (B-B') that converges to zero due to a sharp decrease in the intensity of the Cu element along line A-A' can be defined as the interface between the Cu particles 131a and the glass 131b. That is, the intensity value of the Cu element may gradually decrease from the interface (B-B') between the Cu particles 131a and the glass 131b towards the glass 131b.

FIG. 9 is a line concentration profile analyzing the distribution of O element through Transmission Electron Microscope-Energy Dispersive X-ray Spectroscopy (TEM-EDX) along line A-A' of FIG. 7.

Referring to FIG. 9, the intensity of the O element may gradually increase from the interface (B-B') between the Cu particles 131a and the glass 131b towards the glass 131b. In addition, the intensity of the O element may have one or more inflection points that are points at which the mark of the inclination of the slope changes at the interface (B-B') between the Cu particles 131a and the glass 131b. Since the magnitude of the intensity in TEM-EDX analysis is proportional to the content of the element in question, the content of the O element at the interface (B-B') between the Cu particles 131a and the glass 131b may have one or more inflection points, which are points at which the mark of the inclination of the slope changes.

FIG. 10 is a line concentration profile analyzing the distribution of Si element through Transmission Electron Microscope-Energy Dispersive X-ray Spectroscopy (TEM-EDX) along line A-A' of FIG. 7.

Referring to FIG. 10, the intensity of the Si element may increase gradually towards the glass 131b from the interface (B-B') between the Cu particles 131a and the glass 131b. In addition, the intensity of the Si element may have one or more inflection points that are points at which the mark of the inclination of the slope changes at the interface (B-B') between the Cu particles 131a and the glass 131b. Since the magnitude of the intensity in TEM-EDX analysis is proportional to the content of the element in question, the content of the Si element at the interface (B-B') between the Cu particles 131a and the glass 131b may have one or more inflection points, which are points at which the mark of the inclination of the slope changes.

In an embodiment, the glass 131b may include oxides including at least one of Fe, Sn, Ni, Mn, Ag, and In. This makes it easier to oxidize the Cu particles 131a to form a reaction layer on at least a portion of the interface where the Cu 131a and the glass 131b meet, and further improve the wettability of the Cu particles 131a and of the glass 131b.

The content of oxides including at least one of Fe, Sn, Ni, Mn, Ag, and In is not particularly limited; however, in order to further widen the formation area of the oxides including Cu 131c, the content of at least one of Fe, Sn, Ni, Mn, Ag, and In may be at least 0.005 mol but less than 4.5 moles compared to 100 moles of the sum of Si and Al.

When the content of at least one of Fe, Sn, Ni, Mn, Ag, and In is less than 0.005 moles compared to the sum of 100 moles of Si and Al, the oxides including Cu 131c are not sufficiently formed on the interface between the Cu particles 131a and the glass 131b, and the density improvement effect of the electrode layers 131 and 141 may be insufficient, and if it exceeds 4.5 moles, crystals including at least one of Fe, Sn, Ni, Mn, Ag, and In can be formed and diffused into the glass 131b, and thereby the oxides including Cu 131c may not be sufficiently formed.

According to an embodiment, by adjusting the content of at least one of Fe, Sn, Ni, Mn, Ag, and In included in the glass 131b to at least 0.005 mol but less than 4.5 moles compared to 100 moles of the sum of Si and Al, the oxides including Cu 131c may be sufficiently formed on the interface between the Cu particles 131a and the glass 131b, thereby improving prominently the density of the electrode layers 131 and 141.

Methods of analyzing the composition of the glass are not particularly limited. Methods and/or tools appreciated by one of ordinary skill in the art, even if not described in the present disclosure, may be used. The type and content of elements can be analyzed through TEM-EDX. The amount of at least one of the Fe, Sn, Ni, Mn, Ag, and In, when present, and at least one of Si and Al, when present, may be determined by TEM-EDX.

In an embodiment, the oxides including Cu 131c may be formed by oxidizing a part of the Cu particles 131a. In the process of forming electrode layers 131 and 141 including Cu particles 131a and glass 131b, when the composition and content of metal oxides included in the glass 131b are adjusted, this accelerates the oxidation of the Cu particles 131a and at least on a part of the interface between the Cu particles 131a and the glass 131b, a part of Cu particles 131a is oxidized to form oxides including Cu 131c. At this time, the metal oxides included in the glass 131b capable of accelerating the oxidation of the Cu particles 131a may be oxides including at least one of the above-described Fe, Sn, Ni, Mn, Ag, and In. In particular, when $Fe_2O_3$ is added to the glass 131b before sintering the electrode layers 131 and 141, it may accelerate the Cu particles 131a being oxidized during the sintering process of the electrode layers 131 and 141. Before and after the sintering of the electrode layers 131 and 141, a part of the Cu particles 131a is oxidized on the interface between the Cu particles 131a and the glass 131b to form oxides including Cu 131c and the reaction is described in the following formula:

$$4Cu\ (metal) + 6Fe_2O_3\ (glass) \rightarrow 2Cu_2O\ (interlayer) + 4Fe_3O_4\ (glass) \qquad \text{[Chemical Formula 1]}$$

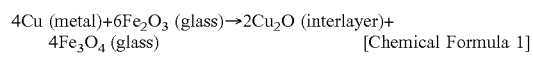

According to the Formula 1, a part of the Cu particles (metal, 131a in the present disclosure) before sintering reacts with $Fe_2O_3$ (glass, glass before being sintered in the present disclosure) in an oxidation or reduction atmosphere of 660° or more to form $Cu_2O$ (interlayer, interface between Cu particles and glass in the present disclosure). $Fe_2O_3$ may exist as $Fe_3O_4$ in the glass 131b included in the electrode layers 131 and 141 after sintering after oxidation of Cu. That is, when [Formula 1] proceeds in the sintering process of the electrode layers 131 and 141, oxides including Cu 131c, which is a part of Cu 131a oxidized on the interface between Cu particles 131a and glass 131b may be disposed in the electrode layers 131 and 141 after sintering, and the oxides including 131c Cu may be $Cu_2O$.

Methods of analyzing the composition of oxides including Cu 131c are not particularly limited. Methods and/or tools appreciated by one of ordinary skill in the art, even if not described in the present disclosure, may be used. As described above, the type and content of elements can be analyzed in the region of the electrode layers 131 and 141 in which the oxides including Cu 131c are formed through TEM-EDX. In addition, when analyzing the type of oxides including Cu, XRD (X-ray Diffraction) can be used. After cutting in the first and second directions from the center of the third direction of the multilayer electronic component 100, polishing the cut edges of the first and second directions of the electrode layers 131 and 141 to produce a sample, the type of oxides including Cu can be identified by identifying the type of crystals of the oxides including Cu 131c through XRD analysis. The ratio of Cu element to O element may be obtained by taking the ratio of the atomic content of Cu element, as determined by TEM-EDX, to the atomic content of O element, as determined by TEM-EDX.

On the other hand, according to the present disclosure, oxides including Cu 131c can be formed on the interface between Cu particles 131a and glass 131b without separately adding oxides including Cu as a material of the glass or the electrode layer before sintering, so that the oxides including Cu 131c can be disposed only on a part of the interface between the Cu particles 131a and the glass 131b, and it may not be disposed on other region except the part of the interface between the Cu particles 131a and the glass 131b. Accordingly, the density of the electrode layers 131 and 141 can be improved and at the same time, excessive oxidation of the Cu particles 131a can be prevented to secure the conductivity of the electrode layers 131 and 141.

On the other hand, when oxides including Cu 131c including $Cu_2O$ is formed on the interface between Cu particles 131a and glass 131b, as in an embodiment, at least on a part of the interface where the Cu particles 131a and glass 131b contact, the ratio of Cu element to O element may be 2 or more.

Meanwhile, in an embodiment, the oxides including Cu 131c may be disposed in a layer form between the Cu particles 131a and the glass 131b to form an oxide layer including Cu.

At this time, the average thickness of the oxide layer including Cu may be greater than 10 nm or less than 50 nm, but is not limited thereto. When the average thickness of the oxide layer with Cu is less than 10 nm, the effect of improving wettability at the interface where the Cu particles 131a and the glass 131b contact may be insufficient. When the average thickness of the oxide layer including Cu exceeds 50 nm, the conductivity of the electrode layers 131 and 141 may not be sufficiently secured due to excessive oxidation of the Cu particles 131a. Therefore, by adjusting the average thickness of the oxide layer to 10 nm to 50 nm or less, the increase in ESR of the multilayer electronic component 100 can be suppressed by improving the density of the electrode layers 131 and 141 and at the same time securing appropriate conductivity.

The average thickness of the oxide layer including Cu may be measured by observing the cross sections of the electrode layers 131 and 141 cut in the first and second directions from the center of the third direction, and it may be an average value of the values measured at any five or more arbitrary points of where the oxides including Cu 131c is formed. Specifically, TEM-EDX can measure the distance from the part where the content of Cu particles 131a Cu element rapidly decreases to the point of convergence to zero and take the average value thereof. Other methods and/or tools appreciated by one of ordinary skill in the art, even if not described in the present disclosure, may also be used.

In an embodiment, the glass 131b may further include oxides including at least one of Co and Ge. Accordingly, the amount of cross-linking oxygen between the glass 131b can be increased to further improve the density of the electrode layers 131 and 141.

In an embodiment, the glass 131b may further include oxides including at least one of Ti and P. Accordingly, by increasing the reactivity of the Cu particles 131a, more oxides including Cu 131c can be generated, thereby further improving the density of the electrode layers 131 and 141, as well as improving chemical resistance.

In an embodiment, the glass 131b may further include oxides including at least one of Si, Al, and B. Oxides including at least one of Si, Al and B may form a glass matrix structure to improve the bonding force of the glass 131b. On the other hand, when the content of oxides including at least one of Si, Al and B is controlled, the bonding force of the glass can be adjusted.

On the other hand, when the content of oxides including Si in the glass frit before sintering is 40 wt % or more to form a glass included in the electrode layers 131 and 141, due to the strong bonding of Si—O, the corrosion resistance to external plating solution becomes excellent, and the resistance to erosion of the glass 131b in the plating process becomes greater which is a great advantage.

However, in the case of a glass with a relatively high Si content, the wettability of the glass to the Cu particles is reduced by the high interface energy at the interface between the glass and the Cu particles, which may result in a decrease of density in the electrode layer. This problem may also occur when the content of oxides including Al or B is increased to form a glass to ensure good corrosion resistance.

According to an embodiment of the present disclosure, as the electrode layers 131 and 141 include Cu particles 131a and glass 131b, and at least a portion of the interface between the Cu particles 131a and the glass 131b includes oxides including Cu 131a, and therefore the wettability may be improved at the interface between the Cu particles 131a and glass 131b, even when the glass with high corrosion resistance, in which a glass includes at least 4.5 wt % of any of Si, Al and B, is applied, the corrosion-resistance of the electrode layers 131 and 141 can be secured, and at the same time, the deterioration of density can be prevented. Accordingly, the reliability of the multilayer electronic component 100 can be further improved. That is, according to an embodiment, when the glass 131b includes at least 4.5 wt % of any of Si, Al and B, the reliability improvement effect of the multilayer electronic component according to the present disclosure may be more remarkable.

In an embodiment, the glass 131b may further include oxides including at least one of Li, Na, K, Ba, Ca, and Sr. Oxides including at least one of Li, Na, K, Ba, Ca, and Sr may serve to control the melting point and fluidity of the glass 131b.

In an embodiment, the glass 131b may further include oxides including Zn. When oxides with Zn is included in the glass 131b, the corrosion resistance to the plating solution of the glass 131b can be further improved.

On the other hand, the method of analyzing the composition of the elements included in the glass 131b is not particularly limited.

In order to increase the capacitance per unit volume of the multilayer electronic component 100, it may be necessary to minimize the proportion of the electrode layers 131 and 141 in the total volume of the multilayer electronic component 100. Accordingly, an attempt was made to make the electrode layers 131 and 141 thinner. That is, in order to maximize the capacitance per unit volume of the multilayer electronic component 100, the average thickness of the electrode layers 131 and 141 is preferably 7 μm or less. However, when the average thickness of the electrode layer is 7 μm or less, the glass 131b included in the electrode layers 131 and 141 may have a problem that elution is facilitated by the plating solution. However, according to an embodiment of the present disclosure, oxides including Cu 131c is disposed at least on a part of the interface between the Cu particles 131a and the glass 131b to improve wettability at the interface between the Cu particles 131a and the glass 131b, therefore improving the density of the electrode layers 131 and 141, so that even when the average thickness of the electrode layers is less than 7 μm, the deterioration of the reliability can be prevented. Accordingly, the reliability of the multilayer electronic component 100 can be further improved. That is, according to an embodiment, when the average thickness of the electrode layers 131 and 141 is 7 μm or less, the reliability improvement effect of the multilayer electronic component according to the present disclosure may be more prominent. The lower limit of the average thickness of the electrode layers 131 and 141 is not particularly limited. However, it is preferable that it is 5 μm or more to secure electrical connectivity with the internal electrodes 121 and 122.

The average thickness of the electrode layer may be measured by observing with a scanning electron microscope (SEM) at 10,000× magnification the cross sections of the electrode layers 131 and 141 cut in the first and second directions from the center of the third direction, and it may be an average value of the values measured at any five or more arbitrary points of the electrode layer. Other methods and/or tools appreciated by one of ordinary skill in the art, even if not described in the present disclosure, may also be used.

FIG. 11 is a mimetic view showing an enlarged Kl region of FIG. 2.

Referring to FIG. 11, the average thickness of the electrode layer 131 may be measured by observing with a scanning electron microscope (SEM) at 10,000× magnification the cross sections cut in the first and second directions from the center of the third direction, and it may be an average value of the size of the first direction of the electrode layer 131 measured at five equidistant interval points in the thickness direction disposed on the third surface or the fourth surface. Specifically, it may be an average value of the first direction of the electrode layer 131 measured at five equidistant interval points (E1, E2, E3, E4, E5) from the internal electrodes disposed at the lowest part to the internal electrodes disposed at the highest part in the thickness direction, from a cross section (L-T cross section) cut from the center of the width direction (third direction) of the body to the length direction (second direction) and the thickness direction (first direction). Other methods and/or tools appreciated by one of ordinary skill in the art, even if not described in the present disclosure, may also be used.

Meanwhile, the present disclosure describes a method for measuring the average thickness of the electrode layers 131 and 141 based on the first electrode layer 131, but this method can be similarly applied to measure the average thickness of the second electrode layer 141.

On the electrode layers 131 and 141, the plating layers 132, 133, 142, and 143 may be disposed.

The plating layers play a role in improving the mounting properties. The type of plating layer is not particularly limited and may be a plating layer including one or more of Ni, Sn, Pd and alloys thereof, and may be formed of a plurality of layers.

To give a more specific example of the plating layer 142, the plating layer may be a Ni plating layer or an Sn plating layer, and the Ni plating layer and the Sn plating layer may be sequentially formed on the electrode layer, and the Sn plating layer, the Ni plating layer and the Sn plating layer may be sequentially formed. In addition, the plating layer may include a plurality of Ni plating layers and/or a plurality of Sn plating layers.

Referring to FIG. 11, in an embodiment, the first plating layer 132 including Ni may be disposed on the electrode layer 131. Through this, when the multilayer electronic component 100 is mounted on the substrate, the thermal shock caused by solder-reflow can be mitigated.

Referring to FIG. 11, in an embodiment, second plating layers 133 and 143 including Sn may be present in addition to the first plating layers 132 and 142 including Ni. That is, the multilayer electronic component may form external electrodes 130 and 140 that include electrode layers 131 and 141, first plating layers 132 and 142 including Ni, and second plating layers 133 and 143 including Sn in a sequentially stacked form.

The second plating layers 133 and 143 include Sn and may play a role in improving the mounting properties when disposed as the outermost layer of the external electrodes 130 and 140.

Embodiments

Table 1 shows the result of the evaluation of the interfacial adhesion between the Cu particles and the glass and the moisture resistance reliability of the multilayer electronic component according to the presence or absence of oxides including Cu.

500 samples of the multilayer electronic component were produced for each test number, and samples were manufactured and their properties were evaluated under the same conditions except for the sintering temperature.

As in an embodiment of the present disclosure, a sample of the multilayer electronic component was coated with Cu particles and a conductive paste including glass frit, binder, and dispersant on its body including internal electrode and dielectric layer and dried, and then a sintering process in the sintering furnace was completed to form an electrode layer. Thereafter, a first plating layer including Ni and a second plating layer including Sn were formed on the electrode layer to complete a sample of the multilayer electronic component.

When oxides including Cu were formed on the interface between the Cu particles and the glass, when the adhesion of the Cu particles and the glass was excellent, and when the moisture resistance reliability was excellent, it was judged to be good. In [Table 1], among the 500 samples, when the proportion of the good products is 0%, it was marked with X, when the proportion of the good products was less than 60%, it was marked with Δ, when it was 60% or more % and less than 90%, it was marked with ○, and when it was 90% or more and less than 100%, it was marked with ⊚.

Whether or not oxides including Cu were formed on the interface between the Cu particles and the glass was analyzed and confirmed through TEM-EDX. The types and the content of the elements included in one area of the electrode layers 131 and 141 were analyzed after these were cut along the first and second directions from the center of the third direction of the multilayer electronic component 100, and the cut surfaces along the first and second directions of the electrode layers 131 and 141 were polished to produce the sample.

The adhesion strength (bonding force) of the Cu particles and the glass was measured by measuring the average and standard deviation of shear strength of three specimens per experimental condition at a cross-head feed rate of 0.001 mm/s using a shear strength tester, and the samples exceeding the shear strength value of more than 130% compared to the overall average were evaluated as good.

In the evaluation of moisture resistance reliability, at 2.5 V for 10 hours at 85° C. and 85% humidity, if it deteriorated to less than $1\times10^4\Omega$ and was judged to be NG even if the insulation resistance value (IR) value was 1 or more, it was evaluated as bad. If the value was $1\times10^4\Omega$ or more, the sample was evaluated as good.

TABLE 1

| Test number | Sintering temperature (° C.) | Whether oxides including Cu are formed | Adhesion of Cu particles and glass | Moisture resistance reliability |
|---|---|---|---|---|
| 1 | 400 | X | X | X |
| 2 | 450 | X | X | X |
| 3 | 500 | X | X | X |
| 4 | 550 | X | X | X |
| 5 | 600 | X | X | X |
| 6 | 650 | X | X | X |
| 7 | 700 | X | X | Δ |
| 8 | 750 | X | Δ | Δ |
| 9 | 800 | X | Δ | Δ |
| 10 | 850 | X | Δ | Δ |
| 11 | 900 | X | Δ | Δ |
| 12 | 400 | Δ | Δ | Δ |
| 13 | 450 | ○ | ○ | Δ |
| 14 | 500 | ◎ | ◎ | Δ |
| 15 | 550 | ◎ | ◎ | ○ |
| 16 | 600 | ◎ | ◎ | ○ |
| 17 | 650 | ◎ | ◎ | ◎ |
| 18 | 700 | ◎ | ◎ | ◎ |
| 19 | 750 | ◎ | ◎ | ◎ |
| 20 | 800 | ◎ | ◎ | ◎ |
| 21 | 850 | ○ | ○ | ○ |
| 22 | 900 | ○ | ○ | ○ |

Referring to Table 1, in the case of test numbers 12 to 22 in which oxides including Cu were formed on the interface between the Cu particles and the glass, the adhesion strength of the interface between the Cu particles and the glass is excellent, and the moisture resistance reliability of the multilayer electronic component is excellent.

In particular, in the case of test numbers 15 to 21 in which the sintering temperature is 550° C. or more and 900° C. or less, the proportion of good products satisfying each characteristic is more than 60%, therefore it can be confirmed that the effect of improving the reliability of the multilayer electronic component is excellent, and when the sintering temperature is between 650° C. to 800° C., it can be confirmed that the moisture resistance reliability improvement effect of the multilayer electronic component is even more excellent.

Therefore, according to an embodiment of the present disclosure, oxides including Cu 131c are disposed on at least a portion of the interface between the Cu particles 131a and the glass 131b, thereby improving the adhesion strength of the Cu particles 131a and the glass 131b, thereby improving the moisture resistance reliability of the multilayer electronic component 100.

On the other hand, according to an embodiment, by adjusting the sintering temperature of the electrode layers 131 and 131 to 550° C. or more and 900° C. or less, preferably 650° C. or more and 800° C. or less to form the oxides including Cu 131c, the adhesion strength of the Cu particles 131a and the glass 131b can be effectively improved, thereby significantly improving the moisture resistance reliability of the multilayer electronic component 100.

The expression 'an embodiment' used in this description does not refer to the same embodiments, and is provided to emphasize and describe each different unique feature. However, the embodiments presented above do not exclude being implemented in combination with features of other embodiments. For example, even if a point described in an embodiment is not described in another embodiment, it may be understood as a description related to another embodiment, unless there is a description that is contrary or contradictory to the point in another embodiment.

The terms used in the present disclosure are used only to describe an embodiment and are not intended to limit the present disclosure. In this case, the singular expression includes the plural expression unless it is clearly meant differently in the context.

Although the embodiments of the present disclosure have been described in detail above, the present disclosure is not limited by the above-described embodiments and accompanied drawings, but it is intended to be limited by the appended claims. Therefore, various forms of substitution, modification and changes will be possible by skilled persons in the art within the scope of the technical spirit of the present disclosure described in the claims, and this will also be said to fall within the scope of the present disclosure.

What is claimed is:

1. A multilayer electronic component, comprising:
a body including a dielectric layer and internal electrodes; and
an electrode layer disposed on the body and connected to the internal electrodes,
wherein the electrode layer includes metal particles of which Cu particles are a main component, at least one oxide including Cu, and glass, and the at least one oxide including Cu is disposed on at least a portion of an interface between the Cu particles and the glass.

2. The multilayer electronic component of claim 1, wherein the at least one oxide including Cu includes $Cu_2O$.

3. The multilayer electronic component of claim 1, wherein the at least one oxide including Cu is $Cu_2O$.

4. The multilayer electronic component of claim 1, wherein the at least one oxide including Cu is an oxidized part of the Cu particles.

5. The multilayer electronic component of claim 1, wherein the glass includes at least one oxide including at least one of Fe, Sn, Ni, Mn, Ag, or In.

6. The multilayer electronic component of claim 5, wherein the glass further includes at least one oxide including at least one of Co or Ge.

7. The multilayer electronic component of claim 5, wherein the glass further includes at least one oxide including at least one of Ti or P.

8. The multilayer electronic component of claim 5, wherein the glass further includes at least one oxide including Si or Al, and at least one of the Fe, Sn, Ni, Mn, Ag, or In, when present, is at least 0.005 mol but less than 4.5 moles compared to 100 moles of a sum of the Si and Al, when present.

9. The multilayer electronic component of claim 1, wherein the glass includes $Fe_3O_4$.

10. The multilayer electronic component of claim 1, wherein a ratio of Cu element to O element in the at least the portion of the interface where the glass and the Cu particles contact is 2 or more.

11. The multilayer electronic component of claim 1, wherein an average thickness of the electrode layer is 7 μm or less.

12. The multilayer electronic component of claim 1, wherein the at least one oxide including the Cu is disposed in an oxide layer including Cu disposed between the Cu particles and the glass.

13. The multilayer electronic component of claim 12, wherein an average thickness of the oxide layer including Cu is at least 10 nm and less than 50 nm.

14. The multilayer electronic component of claim 1, wherein the at least one oxide including the Cu is disposed only on a part of the interface between the Cu particles and the glass.

15. The multilayer electronic component of claim 1, wherein a first plating layer including Ni is disposed on the electrode layer.

16. The multilayer electronic component of claim 15, wherein a second plating layer including Sn is disposed on the first plating layer.

17. A multilayer electronic component, comprising:
a body including a dielectric layer and internal electrodes; and
an electrode layer disposed on the body and connected to the internal electrodes,
wherein the electrode layer includes Cu particles, at least one oxide including Cu, and glass, and the at least one oxide including Cu is disposed on at least a portion of an interface between the Cu particles and the glass, and
wherein the at least one oxide including the Cu is disposed in an oxide layer including Cu disposed between the Cu particles and the glass.

18. The multilayer electronic component of claim 17, wherein an average thickness of the oxide layer including Cu is at least 10 nm and less than 50 nm.

19. The multilayer electronic component of claim 17, wherein the glass includes at least one oxide including at least one of Fe, Sn, Ni, Mn, Ag, or In.

20. The multilayer electronic component of claim 17, wherein an average thickness of the electrode layer is 7 μm or less.

21. A multilayer electronic component, comprising:
a body including a dielectric layer and internal electrodes; and
an electrode layer disposed on the body and connected to the internal electrodes,
wherein the electrode layer includes Cu particles, at least one oxide including Cu, and glass, and the at least one oxide including Cu is disposed on at least a portion of an interface between the Cu particles and the glass, and
wherein the at least one oxide including the Cu is disposed only on a part of the interface between the Cu particles and the glass.

22. The multilayer electronic component of claim 21, wherein the glass includes at least one oxide including at least one of Fe, Sn, Ni, Mn, Ag, or In.

23. The multilayer electronic component of claim 21, wherein an average thickness of the electrode layer is 7 μm or less.

\* \* \* \* \*